(12) United States Patent
Seaton

(10) Patent No.: US 10,162,249 B2
(45) Date of Patent: Dec. 25, 2018

(54) CAMERA LENS SHADE EXTENDER

(71) Applicant: Barry G. Seaton, Knoxville, TN (US)

(72) Inventor: Barry G. Seaton, Knoxville, TN (US)

( * ) Notice: Subject to any disclaimer, the term of this patent is extended or adjusted under 35 U.S.C. 154(b) by 0 days.

(21) Appl. No.: 15/127,474

(22) PCT Filed: Mar. 26, 2015

(86) PCT No.: PCT/US2015/022726
§ 371 (c)(1),
(2) Date: Sep. 20, 2016

(87) PCT Pub. No.: WO2015/148794
PCT Pub. Date: Oct. 1, 2015

(65) Prior Publication Data
US 2017/0212413 A1    Jul. 27, 2017

Related U.S. Application Data

(60) Provisional application No. 61/971,670, filed on Mar. 28, 2014.

(51) Int. Cl.
*G03B 17/56* (2006.01)
*G03B 11/04* (2006.01)

(52) U.S. Cl.
CPC .......... *G03B 17/566* (2013.01); *G03B 11/045* (2013.01)

(58) Field of Classification Search
CPC .... G06F 1/1603; G06F 1/1607; G06F 1/1609; G06F 1/1611; G06F 1/1616; G06F 1/1628; G02B 27/0172; G02B 27/0176; G02B 7/00; G02B 7/006; G02B 7/20; G03B 11/045; G03B 17/12; G03B 15/06; G03B 17/56; G03B 17/566; G03B 11/04; G03B 11/048; G03B 11/00; G03B 11/02; G03B 11/046
USPC ....... 359/601, 612, 611, 879, 610, 613, 614, 359/633, 894, 544, 534, 871; 396/544, 396/534; 348/834, 818, 836; 312/7.2; 345/8; 353/97, 75; 361/679.22; 400/713
See application file for complete search history.

(56) References Cited

U.S. PATENT DOCUMENTS

| | | | | |
|---|---|---|---|---|
| 5,101,298 A | * | 3/1992 | Lentz | H04N 5/65 359/612 |
| 2009/0129046 A1 | | 5/2009 | Fong | |
| 2009/0195684 A1 | * | 8/2009 | Hurst | H04N 5/2251 348/333.06 |

FOREIGN PATENT DOCUMENTS

| | | |
|---|---|---|
| WO | 1992015914 | 9/1992 |
| WO | 2010118065 | 10/2010 |

OTHER PUBLICATIONS

Tom Hogan (NPL—Flex Lens Shade, Feb. 21, 2012; PDF from commercially available product).*

* cited by examiner

*Primary Examiner* — Thomas K Pham
*Assistant Examiner* — Alberto Betancourt
(74) *Attorney, Agent, or Firm* — Luedeka Neely Group, P.C.

(57) ABSTRACT

A lens shade extender is a camera accessory comprising a flat rubber band, a hook-and-loop cinch strap, and one or more opaque plastic shades. The extender quickly and easily attaches to a camera lens hood for blocking extraneous light and glare without blocking the lens angle of view.

7 Claims, 6 Drawing Sheets

CAMERA LENS SHADE EXTENDER

FIELD

This invention relates to the field of photography and videography. More particularly, this invention relates to a camera lens shade extender.

BACKGROUND

Camera lenses are often supplied with a lens hood for shielding rays of light coming from outside the picture area, or outside the angle of view of the lens. These extraneous rays of light can otherwise cause glare and reduce the quality of the captured image of the subject. Zoom lenses by their design change the angle of view. When a standard lens hood is supplied with a zoom lens it is designed to give the maximum shade for only the widest angle of view of the lens because any further shading for narrower angles of view, using a longer hood, would cause obstruction to the captured image at wider views.

One current practice, when further shading is necessary at narrower angle views, the operator will resort to using their hand in order to block the unwanted light. A problem with this practice is that it is preferred to hold the camera with both hands, more efficiently operating its controls and more easily holding the camera steady. This is a particular problem with holding larger heavier lenses for extended periods. As an alternate solution an extra person may be employed, at additional cost, to stand by and block the unwanted light using various suitable objects to hand.

Known shades exist which can be adjusted for the lens angle of view. However while these devices have generally functioned to provide additional shade, they are less than ideal in terms of their ease of deployment and adjustability. They tend to be awkward for incremental positioning for different angles of view, and are also cumbersome in repositioning when switching between landscape and portrait camera positions. Accordingly, there is a need in the art for an improved lens shade which deploys quickly and adjusts easily.

SUMMARY OF THE INVENTION

The above and other needs are met by camera lens accessory which blocks extraneous light without blocking the angle of view of the lens. The object of the lens shade extender is to quickly facilitate necessary shading by easily adjusting for different lens angles of view and different orientations of the camera. Preferred embodiments of the lens shade extender include one or more shading members, a flat band disposed around the circumference of a lens hood or lens housing and a strap configured to be disposed over the flat band and around the circumference of the lens hood or lens housing. The strap is further configured to overlap for a portion of the circumference of the lens hood or lens housing. One or more shade members disposed between the overlapping strap portions are held in place while being slideably engaged for continuously positionable shading.

BRIEF DESCRIPTION OF THE DRAWINGS

Numerous advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Various embodiments of the invention provide a lens shade extender, which is a camera accessory that quickly attaches to a camera lens or camera lens hood for blocking extraneous light and glare without blocking the angle of view of the lens.

Figure 7:
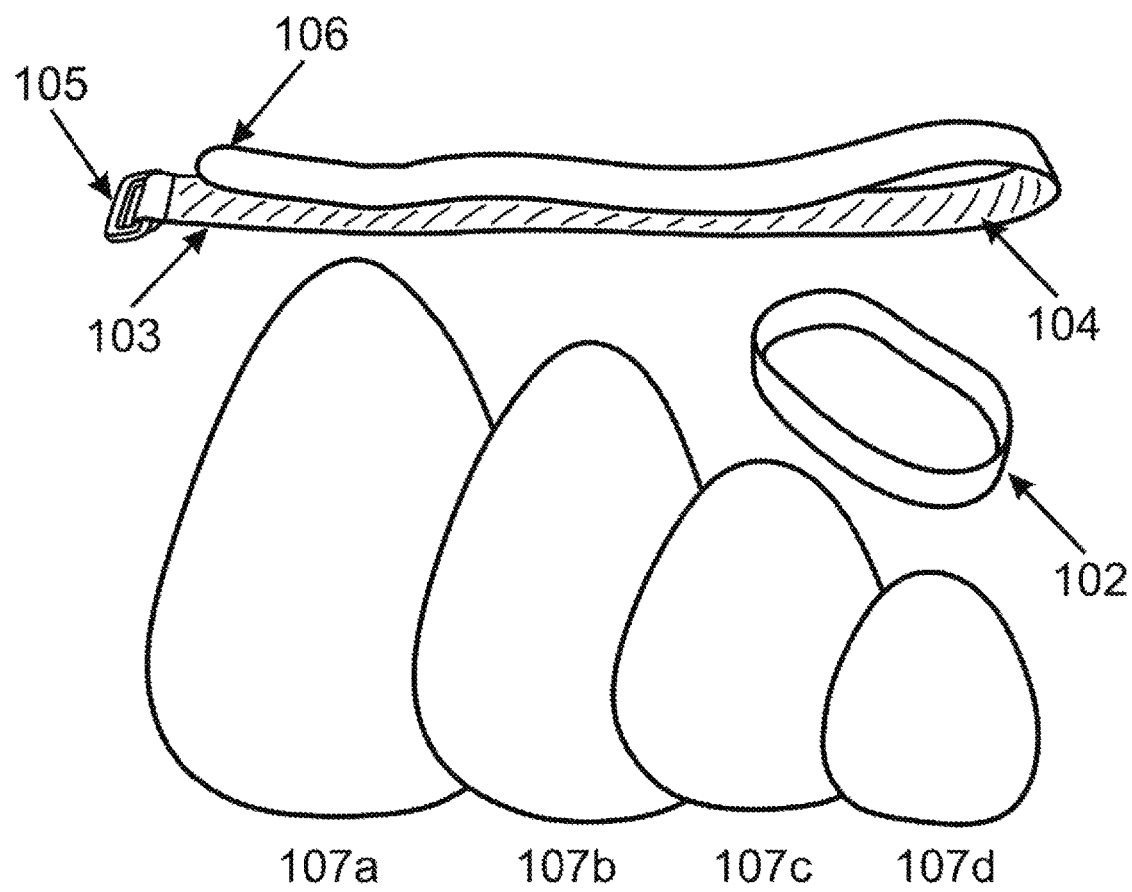
FIG. 7 depicts a hook-and-loop cinch strap, rubber band, and various sizes of plastic shades according to an embodiment of the invention.

In a preferred embodiment depicted in FIG. 7 in unassembled form, the lens shade extender comprises a flat rubber band 102, hook-and-loop cinch strap 103, and one or more opaque plastic shades 107a-107d. Plastic is the preferred material for the shade, but other materials could be used. The plastic shade preferably has a narrow elliptical point at one end and a wide elliptical shape at the other end, providing either a pinpoint shade or a broad shade, thereby allowing for different amounts of extraneous light to be blocked. In preferred embodiments, the underside of the opaque shade is dull to reduce any light reflecting back into the lens.

Figure 1:
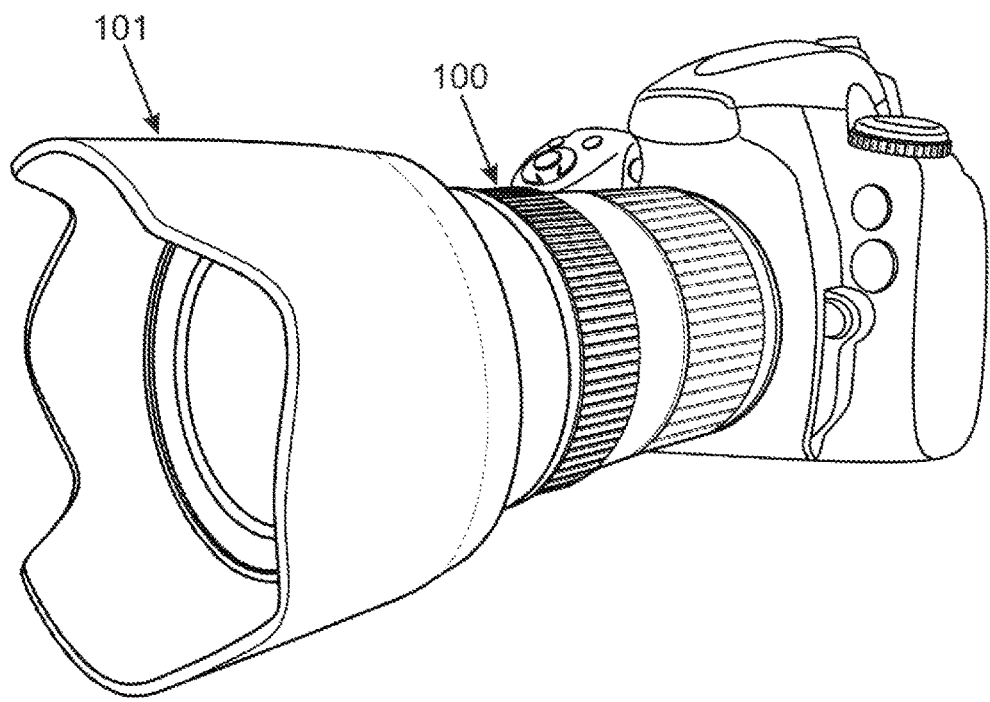
FIG. 1 depicts a camera with a lens hood.
Figure 2:
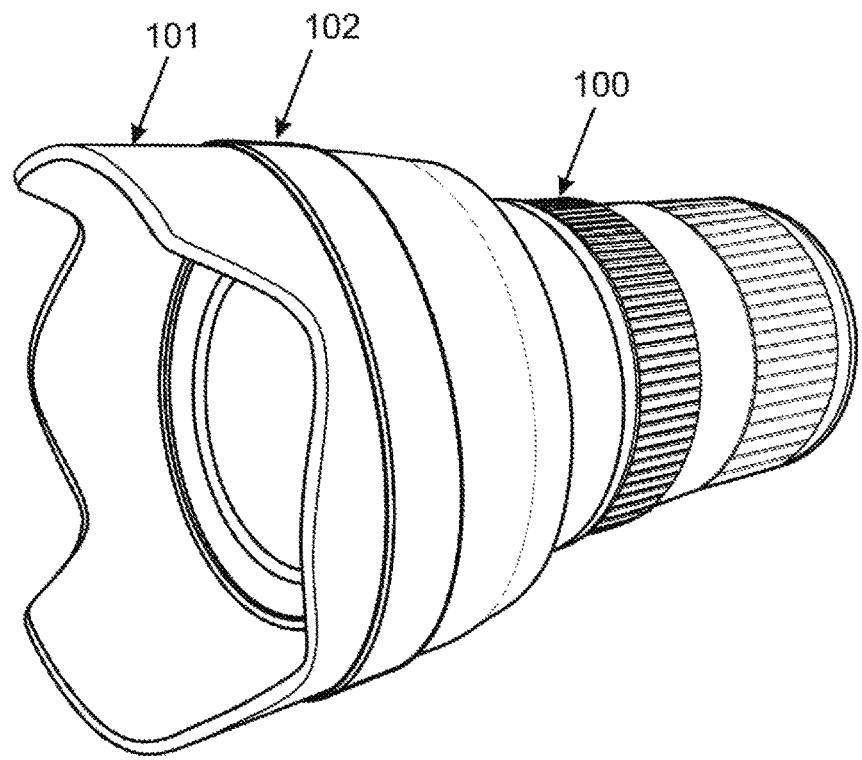
FIG. 2 depicts a rubber band disposed around the lens hood according to an embodiment of the invention.
Figure 3A:
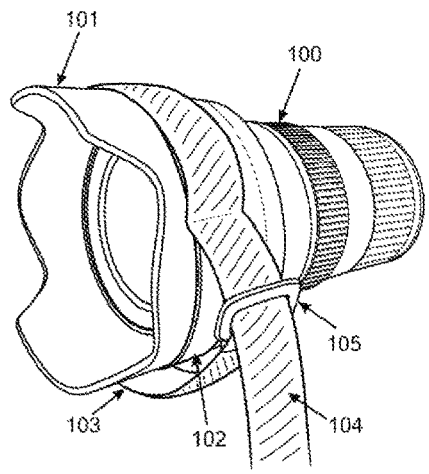
FIGS. 3A, 3B and 3C depict attachment of a hook-and-loop cinch strap around the lens hood according to an embodiment of the invention.
Figure 3B:
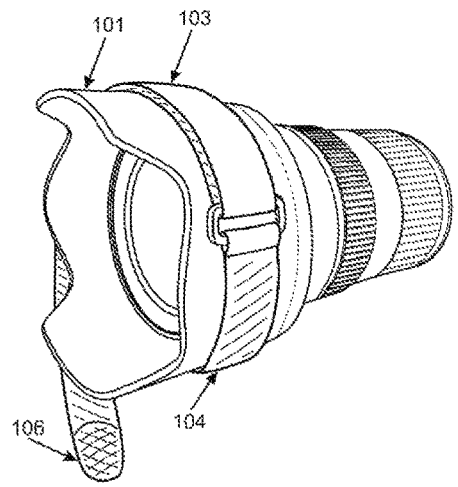
Figure 3C:
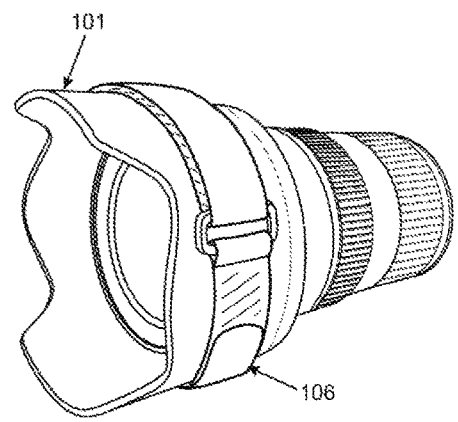
Figure 4A:
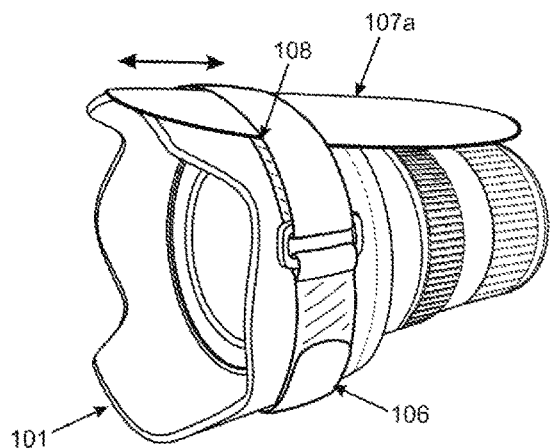
FIGS. 4A-4E depict a plastic shade inserted between two opposing portions of the hook-and-loop cinch strap and positioned at various different rotational orientations with respect to the camera lens hood according to an embodiment of the invention.
Figure 4B:
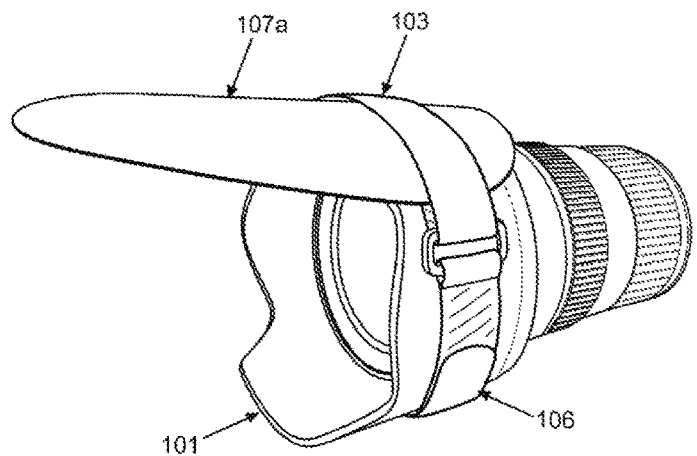
Figure 4C:
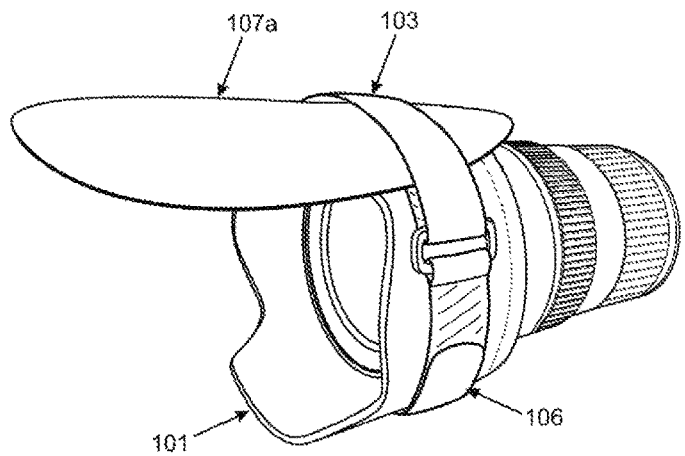
Figure 4D:
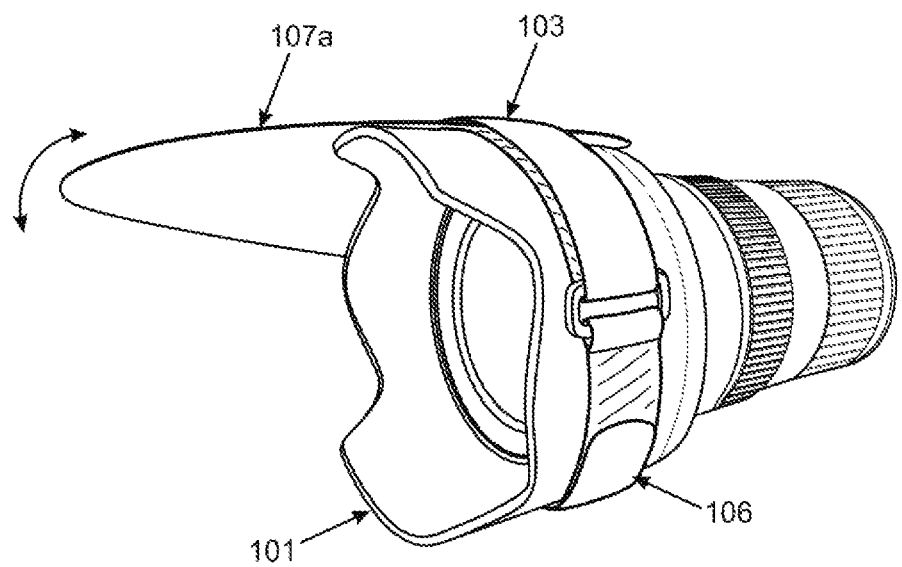
Figure 4E:
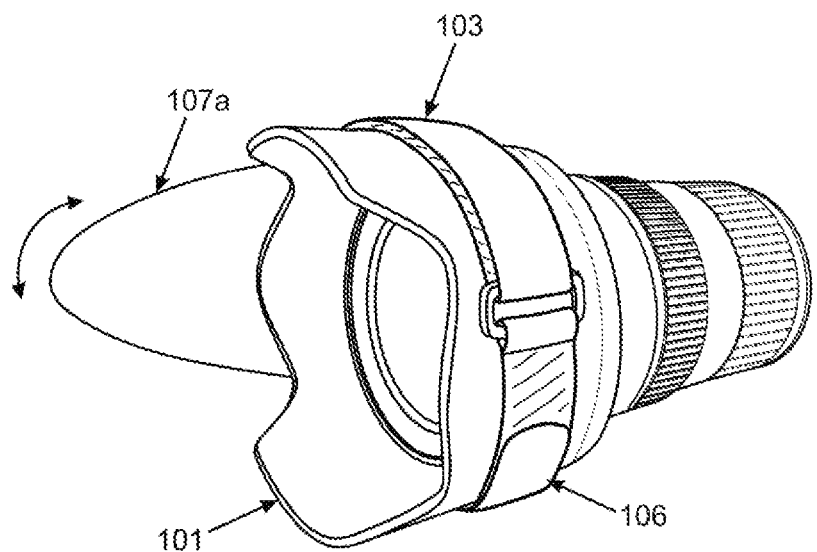

As depicted in FIGS. 1 and 2, the flat rubber band 102 is first put around the lens hood 101 to provide a friction grip for the cinch strap. As shown in FIGS. 3A-3C, the cinch strap is then wrapped around the lens hood and threads through its buckle 105 and back onto itself to tighten up on the lens hood. The cinch strap is preferably held in place at one end with a piece of hook material 106 that attaches to outward-facing loop material 104. As shown in FIGS. 4A-4E, the plastic shade 107a slides between the two facing pieces of loop material 108, thereby allowing the shade to be held in place while also being able to slide back and forth and sideways Embodiments of the lens shade extender offer the advantage of hands-free shading and adjustability for different focal lengths (zooms). As shown in FIGS. 4D and 4E, the shade will also adjust sideways around the lens to allow for horizontal and vertical shooting without repositioning the cinch strap.

Figure 5:
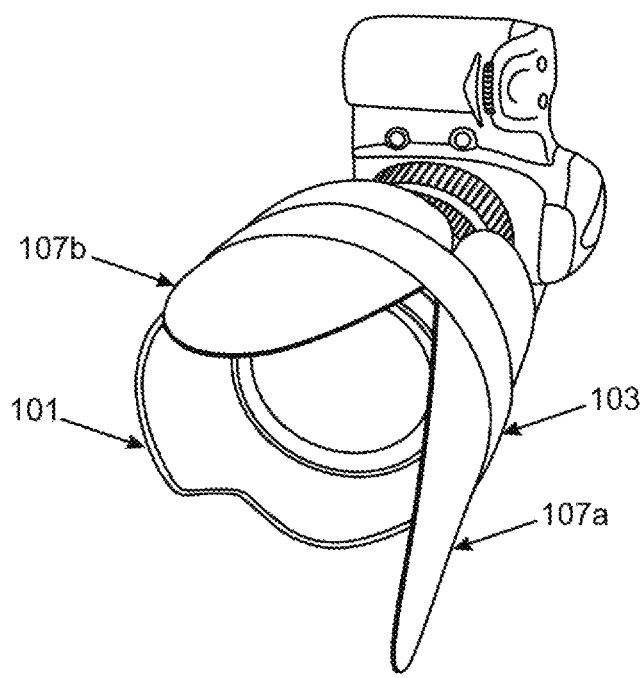
FIG. 5 depicts two plastic shades of different sizes inserted between two opposing portions of the hook-and-loop cinch strap and positioned at two different rotational orientations with respect to the camera lens hood according to an embodiment of the invention.
Figure 6:
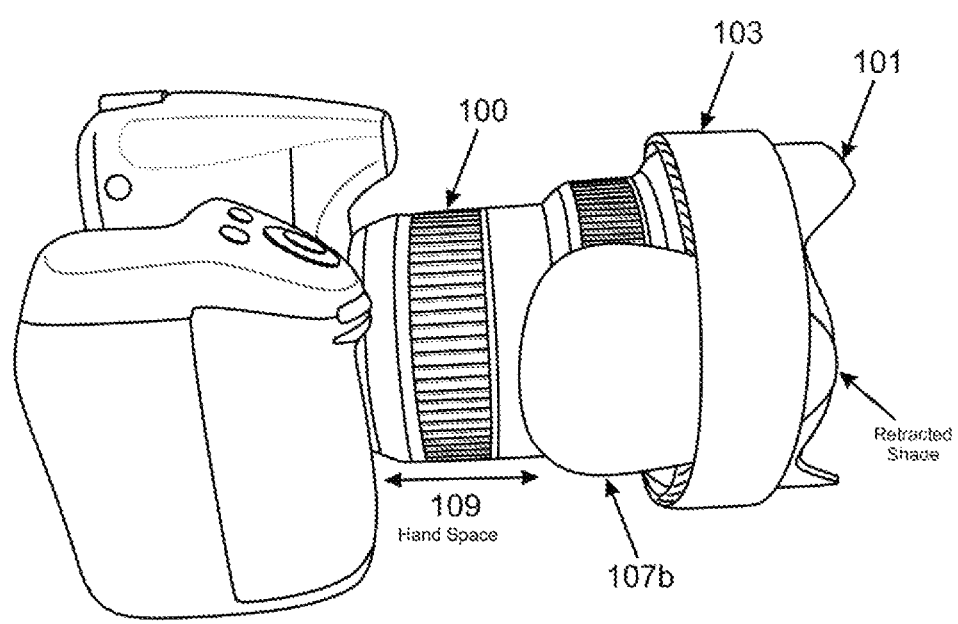
FIG. 6 depicts a small plastic shade inserted between two opposing portions of the hook-and-loop cinch strap in a retracted position according to an embodiment of the invention.

As shown in FIG. 5, two plastic shades 107a, 107b can be attached for two different shooting orientations, thereby providing the convenience of not needing to slide the shade sideways when switching between horizontal and vertical orientations. Since the vertical edge of a horizontal rectangular image is closer to the extraneous light being blocked, the vertical shade can be shorter. When the shade is in a retracted position, this provides space 109 for a hand to hold the camera. FIG. 6 depicts a vertical shade 107*b* in a retracted position.

In a preferred embodiment, a hook and loop cinch strap when deployed in the aforementioned embodiment is long enough to allow two or more shade members to be used simultaneously, but not so long to reach beyond the remaining outward facing loop material 104 that a piece of hook material 106 is preferred to attach.

In some embodiments, the lens shade extender can attach directly to some camera lenses, rather than to a lens hood. These embodiments provide shading when there is no lens hood on the camera.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A camera lens shade comprising:
a strap wrapped around a circumference of a lens hood or lens housing, the strap having overlapping strap portions, including an outward-facing portion that is overlapped with and attached to an inward-facing portion;
a first shade member having opposing first and second ends, wherein the first end comprises a narrow elliptical point and the second end comprises a broad elliptical shape that is larger than the narrow elliptical point, the first shade member sandwiched between the outward-facing portion and the inward facing portion of the overlapping strap portions and held in place thereby, the first shade member slidably engaged with the strap to allow for adjustment of positions of the first shade member with respect to the lens hood or lens housing, thereby allowing for sliding adjustment of the first shade member with respect to the lens hood or lens housing without having to reposition the strap; and
a second shade member sandwiched between the outward-facing portion and the inward facing portion of the overlapping strap portions and held in place thereby, the second shade member spaced apart from the first shade member and independently slidably engaged with the strap to allow for adjustment of positions of the second shade member with respect to the first shade member.

2. The camera lens shade of claim 1, further comprising a band disposed around the circumference of a lens hood or lens housing, wherein the strap is disposed over the band.

3. The camera lens shade of claim 2, in which the band comprises rubber.

4. The camera lens shade of claim 1, in which the strap comprises a cinch strap.

5. The camera lens shade of claim 1, in which one or both of the first and second shade members have a black surface.

6. The camera lens shade of claim 1 wherein the second shade member has a first end comprising a narrow elliptical point and a second end having a broad elliptical shape that is larger than the narrow elliptical point.

7. The camera lens shade of claim 1 wherein overlapping strap portions comprise hook-and-loop material.

* * * * *